United States Patent Office 2,967,117
Patented Jan. 3, 1961

2,967,117

PROCESS FOR COATING A SUBSTRATE WITH A MIXTURE OF A POLYHYDROXY POLYESTER AND A POLYISOCYANATE

Hanns F. Arledter, Stockbridge, Mass., and Hans-Frank Piepenbrink, deceased, late of Leverkusen, Germany, by Ursula B. Piepenbrink, administratrix, Leverkusen, Germany, assignors, by direct and mesne assignments, of one-half to Farbenfabriken Bayer Aktiengesellschaft, Leverkusen, Germany, a corporation of Germany, and one-half to Mobay Chemical Company, Pittsburgh, Pa., a corporation of Delaware No Drawing. Filed May 20, 1955, Ser. No. 510,012
In Germany Jan. 25, 1949

Public Law 619, Aug. 23, 1954
Patent expires Jan. 25, 1969

7 Claims. (Cl. 117—106)

This invention relates to a process of impregnation, lacquering or coating webs, wires and the like.

When layers of plastics are applied to webs consisting of plastics or metal foils, and when wire is lacquered or when webs of for example paper or fabric are lacquered or impregnated, use is frequently made of synthetic low polymers or monomeric substances which are only condensed, polymerised or polycondensed on the web, as far as possible in a continuous operation using a heat treatment, to produce linear or cross-linked plastics.

The reaction time in the preparation of such plastic layers on the web is often very long, especially when an upper limit is set for the temperature of the reaction duct in order to maintain the properties of the web to be treated, for example in order to prevent shrinkage or modification of the surface. Economic lacquering or impregnation of travelling webs with many plastics is thus jeopardised or rendered impossible.

It is known that polymerisation, condensation and polycondensation processes can be influenced by the addition of catalytically acting accelerators. However, when travelling webs are being produced, difficulties arise when such catalysts are used, for example in the dipping process, since the solutions of the initial plastic products react quickly in the cold and bring about a change in their viscosity. Consequently, it is only possible to produce homogeneous coatings of the same thickness with difficulty and in a relatively long time.

A process has now been developed for the continuous impregnation, lacquering, coating or like treatment of webs of paper, plastic materials, fabric or metal, and also wires, with substances which are condensed, polymerised or polycondensed on a travelling web. This process comprises treating the surface of the web or wire with a reaction accelerator in the form of a gas, vapour or mist so as to produce catalytic acceleration of the condensation, polymerisation or polycondensation of the previously applied plastic layer. By vaporizing, blowing or spraying the catalytically acting substances on to the plastic layer being formed after passage through a dipping bath, for example, the reaction time can be reduced to such a degree that it is possible to work economically at a high speed or at low working temperature, and is readily possible to maintain the viscosities of the solution used at a substantially constant value. Plastic products obtained by reacting polyhydroxy compounds with polyisocyanates, and also silicols can be used. As catalysts, tertiary amines or phosphines can be used, if desired in admixture with water; for example the following compounds can be used: Dimethyl-isobutylamine, hexahydrodimethylaniline, triethylphosphine, tetramethyl-ethylenediamine, pentamethyl-diethylenetriamine.

This process has proved to be of particular advantage when using lacquer solutions prepared from polyhydroxy compounds and polyfunctional isocyanates, which are to be condensed on a travelling web to provide the known synthetic high polymers. Examples of suitable polyfunctional isocyanates are diisocyanates, such as 1,2,4-toluylene diisocyanate, 1,2,6-toluylene diisocyanate and a technical mixture thereof, hexamethylene diisocyanate, 4,4'-diphenylmethane diisocyanate, or triisocyanates, such as triphenylmethane triisocyanate. As a triisocyanate it is also possible to use the reaction product of 1 mol of a trihydric alcohol with 3 mols of a diisocyanate, e.g. the reaction product of trimethylol propane and toluylene diisocyanate. As polyhydroxy compounds, these are preferably branched polyesters containing hydroxyl groups, such as can be obtained by the polycondensation of dibasic acids, such as adipic acid or phthalic acid, with trihydric alcohols or alcohols containing more than three hydroxyl groups, such as glycerine, hexanetriol, trimethylolpropane or mixtures thereof with dihydric alcohols. When preparing these branched polyesters containing hydroxyl groups, preferably the hydroxyl groups are in slight excess as compared with the carboxyl groups, so as to ensure that the terminal groups consist mainly of hydroxyl groups. These branched polyesters containing hydroxyl groups are generally oily substances or waxes having a low melting point. Film-forming plastics containing hydroxyl groups can be used as polyhydroxy compounds; examples of such plastics are cellulose acetate and copolymers of vinyl chloride with vinyl alcohol.

In all cases, the result of the reaction of these polyhydroxy compounds with polyfunctional isocyanates is that enlargement of the molecule and cross-linking take place, with the formation of urethane groups. The degree of cross-linking and increase in the size of the molecule can be controlled by varying the proportions. The increase in the size of the molecule is greater when one isocyanate group is used for each hydroxyl group. If it is desired to have a molecule of smaller size, it is desirable to use fewer isocyanate groups.

In continuous production, the web lacquered or impregnated with the treating material based on polyhydroxy compounds and polyfunctional isocyanates should not come into contact with any object after the dipping or surface treatment until it has been finally condensed to such a degree that it is no longer tacky. The condensation time needed to remove the surface tackiness is, for example, more than 10 minutes at 120° C. If the vapour or the solution of the reaction accelerator, for example a tertiary amine, for example $[(CH_3)_2.N.(CH_2)_2]_2.O$ is blown, with or without the addition of steam, on to the surface in accordance with the invention to accelerate the condensation reaction at a place on the web at which the solvent has already evaporated to a large extent, the condensation time is very greatly reduced. This condensation time is, for example, 5 to 7 minutes at 60° C., while at 100° C. it is 2 minutes and at 120° C. it is 1 minute.

When this process is used, it is possible to impregnate paper in a particularly advantageous manner by using a liquid condensate of a linear polyester, prepared from 3 mols of butylene glycol, 1 mol of hexanetriol and 3 mols of adipic acid, with 2,4-toluylene diisocyanate. This low-polymer condensate is stable at room temperature and can be used, for example, in 50% solution. The polycondensation is then initiated by heat treatment with the aid of tertiary amines, either alone or in conjunction with steam; this polycondensation leads to the formation of high-quality plastic layers.

It has been shown that steam exerts a strong accelerating action on the cross-linking reaction in the formation of plastics from polyhydroxy compounds and polyfunctional isocyanates. It is therefore advantageous to carry out the condensation with a mixture of the catalyst, for example a tertiary amine, and steam. In the impregnation of paper or fabric webs, this mixture of steam and catalyst, for example a tertiary amine, can be obtained by introducing such a mixture containing a moisture content of, for example, 7%. It then gives off 3 to 4% of water at 100° C. in the condensation duct and has a catalytic effect on the cross-linking reaction.

For the condensation of, for example, dimethyl siloxane and monomethyl siloxane to form the so-called silicone plastics, the relatively long time of, for example, 10 to 30 minutes is necessary. By the introduction of catalysts, such as tertiary amines, in accordance with the invention, the condensation period can be shortened to such a degree that an economical working method for lacquering travelling webs is obtained.

The process of catalysts in the production of travelling plastic webs by condensation or polymerisation on the web is suitable for quite general use with those plastics in which cross-linking reactions make it necessary for the reaction to take place during the manufacture of the travelling web. It is thus also possible to make use of plastics which are insoluble in the finally reacted condition for the production of foils.

*Example 1*

A paper or spun fabric web is drawn through a dipping bath consisting of a solution of 100 parts of a polyhydroxy ester and 74 parts of an isocyanate in a mixed solvent comprising 195 parts of chlorobenzene, 100 parts of toluene and 175 parts of methylene chloride. The polyhydroxy ester is prepared from 2.5 mols of adipic acid, 0.5 mol of phthalic acid and 3 mols of hexanetriol by thermal condensation at 150° C. to 220° C.; and the isocyanate from 3 mols of 2,4-toluylene diisocyanate and 1 mol of hexanetriol by heating at 150° C. for 2 hrs. The impregnated paper is passed through a vertical duct heated to 80° C. At the place on the paper web at which most of the solvent has already been vaporised, the vapour of a water-moist tertiary amine having the general formula

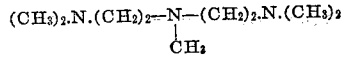

is sprayed on to the surface through suitably constructed spraying devices. The catalytic vapour mixture is produced by violently blowing a stream of nitrogen through a washing vessel filled with an aqueous solution of the amine and feeding the gas mixture thus formed to the required position through a pipe connection. The paper requires a period of condensation of 2½ minutes at 80° C.

Paper and fabrics having particularly valuable properties are obtained in this manner. They are water-tight and resistant to water and rubbing, and can be used for insulating purposes and for condenser construction. They can also be used as hygienic packing paper, as printing paper, and as photographic paper stock.

*Example 2*

A web of a glass silk fabric is continuously passed through a 50% solution of methyl silicol in ethyl acetate which is cooled to 15° C. The lacquer is thereafter condensed whilst continuously passing the web through a vertical duct which is 2 metres long and is heated to 180° C. In order to reduce the time of condensation, the vapour of a tertiary amine of the general formula

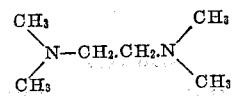

is blown on to the web at the place at which most of the solvent or diluent of the silicol has already evaporated.

The vapour of the amine is obtained by violently blowing a stream of nitrogen through a 50% aqueous solution thereof which is heated in a washing vessel to 25 to 30° C., and blowing the stream of gas and vapour through nozzles on to the fabric web.

In this manner it is possible to work with speeds of 1 metre per minute using a heating duct 2 metres long and a condensation temperature of 180° C., if the lacquer contains more than 50% of the trifunctional silicol.

For the purposes of convenience of expression, it is to be understood that the expression "substrate" shall include webs such as sheets or layers of fabrics, paper, plastics, metal and the like and also wire; the expression "coating" shall include coating, impregnating, lacquering and the like; the expression "polymerisation" shall include polymerisation, condensation and/or polycondensation which may or may not be accompanied by a cross-linking reaction; and the expression "gaseous state" shall include gaseous state, vapour and/or mist.

What is claimed is:

1. A process for coating a substrate which comprises continuously applying to said substrate a mixture of a polyhydroxyl polyester and a polyisocyanate and polymerizing said mixture by continuously applying thereto a gaseous reaction accelerator selected from the group consisting of tertiary amines and phosphines.

2. A process for coating a substrate which comprises continuously applying to said substrate a mixture of a polyhydroxyl polyester and a polyisocyanate and polymerizing said mixture by continuously applying thereto a gaseous tertiary amine.

3. A process for coating a substrate which comprises continuously applying to said substrate a mixture of a polyhydroxyl polyester and a polyisocyanate and polymerizing said mixture by continuously applying thereto a gaseous phosphine.

4. A process for coating a substrate which comprises continuously applying to said substrate a mixture of a polyhydroxyl polyester and a polyisocyanate and polymerizing said mixture by continuously applying thereto a mixture of steam and a gaseous reaction accelerator selected from the group consisting of tertiary amines, and phosphines.

5. A process for coating a substrate which comprises continuously applying to said substrate a mixture of a polyhydroxyl polyester and a polyisocyanate and polymerizing said mixture by continuously applying thereto a mixture of steam and a gaseous tertiary amine.

6. A process for coating a substrate which comprises continuously applying to said substrate a mixture of a polyhydroxyl polyester and a polyisocyanate and polymerizing said mixture by continuously applying thereto a mixture of steam and a gaseous phosphine.

7. A process for coating a substrate which comprises drawing said substrate through a dipping bath containing a polyhydroxyl polyester-polyisocyanate reaction mixture passing said substrate containing said polyhydroxyl polyester-polyisocyanate reaction mixture through a heating zone and continuously applying thereto a gaseous reaction accelerator selected from the group consisting of tertiary amines and phosphines.

(Other references on following page)

References Cited in the file of this patent

UNITED STATES PATENTS

| | | |
|---|---|---|
| 2,123,152 | Rivat | July 5, 1938 |
| 2,258,218 | Rochow | Oct. 7, 1941 |
| 2,270,285 | Frolich | Jan. 20, 1942 |
| 2,306,222 | Patrode | Dec. 22, 1942 |
| 2,371,068 | Rochow | Mar. 6, 1945 |
| 2,432,148 | Furness et al. | Dec. 9, 1947 |
| 2,439,108 | Staehle | Apr. 6, 1948 |
| 2,462,678 | Roedel | Feb. 22, 1949 |
| 2,517,777 | Fenn et al. | Aug. 8, 1950 |
| 2,528,606 | Pedersen | Nov. 7, 1950 |
| 2,620,317 | Johannson | Dec. 2, 1952 |
| 2,652,385 | Hunter et al. | Sept. 15, 1953 |
| 2,657,151 | Gensel et al. | Oct. 27, 1953 |
| 2,729,618 | Muller | Jan. 3, 1956 |

FOREIGN PATENTS

| | | |
|---|---|---|
| 580,525 | Great Britain | Sept. 11, 1946 |